(12) United States Patent
Schwager et al.

(10) Patent No.: US 8,995,593 B2
(45) Date of Patent: Mar. 31, 2015

(54) COMMUNICATION DEVICE USING SPATIAL DIVERSITY, COMMUNICATIONS SYSTEM AND METHOD

(75) Inventors: Andreas Schwager, Waiblingen (DE); Daniel Schneider, Stuttgart (DE)

(73) Assignee: Sony Corporation, Tokyo (JP)

(\*) Notice: Subject to any disclaimer, the term of this patent is extended or adjusted under 35 U.S.C. 154(b) by 34 days.

(21) Appl. No.: 13/821,396

(22) PCT Filed: Aug. 11, 2011

(86) PCT No.: PCT/EP2011/004046
§ 371 (c)(1),
(2), (4) Date: May 14, 2013

(87) PCT Pub. No.: WO2012/034622
PCT Pub. Date: Mar. 22, 2012

(65) Prior Publication Data
US 2013/0230112 A1 Sep. 5, 2013

(30) Foreign Application Priority Data

Sep. 14, 2010 (EP) .................................. 10009557

(51) Int. Cl.
| | | |
|---|---|---|
| H04B 1/10 | (2006.01) | |
| H04B 7/04 | (2006.01) | |
| H04B 3/54 | (2006.01) | |
| H04B 7/08 | (2006.01) | |
| H04B 3/32 | (2006.01) | |

(52) U.S. Cl.
CPC .............. *H04B 7/0413* (2013.01); *H04B 3/542* (2013.01); *H04B 7/0452* (2013.01); *H04B 7/0851* (2013.01); *H04B 3/32* (2013.01); *H04B 2203/5425* (2013.01); *H04B 2203/5466* (2013.01)

USPC ............................................. 375/349; 375/257

(58) Field of Classification Search
USPC ......... 375/141, 144, 148, 267, 299, 347–349, 375/257
See application file for complete search history.

(56) References Cited

U.S. PATENT DOCUMENTS

| | | | | |
|---|---|---|---|---|
| 6,473,467 | B1 * | 10/2002 | Wallace et al. | 375/267 |
| 7,295,517 | B2 * | 11/2007 | Anim-Appiah et al. | 370/232 |
| 7,620,370 | B2 * | 11/2009 | Barak et al. | 455/67.13 |

(Continued)

FOREIGN PATENT DOCUMENTS

| | | |
|---|---|---|
| EP | 2 019 496 | 1/2009 |
| EP | 2 061 160 | 5/2009 |

OTHER PUBLICATIONS

International Search Report Issued Nov. 4, 2011 in PCT/EP11/04046 Filed Aug. 11, 2011.

*Primary Examiner* — Emmanuel Bayard
(74) *Attorney, Agent, or Firm* — Oblon, McClelland, Maier & Neustadt, L.L.P.

(57) ABSTRACT

In a MIMO communications system a communication device receives one or more receive signals on at least one receiver port. A receiver unit recovers, from the at least one receive signal, at least a first transmit signal transmitted to the receiving communication device via a transmission channel. A multi-link decoder unit decodes the receive signals using a multi-link decoder algorithm with parameters derived from a first channel state information describing the transmission channel and second channel state information describing at least one interference channel via which one or more second transmit signals arrive at the communication device.

20 Claims, 9 Drawing Sheets

(56) References Cited

U.S. PATENT DOCUMENTS

| | | | |
|---|---|---|---|
| 8,842,555 B2 * | 9/2014 | Tinnakornsrisuphap et al. | 370/252 |
| 8,867,633 B2 * | 10/2014 | Suehiro | 375/260 |
| 2005/0094667 A1 * | 5/2005 | Dahlman et al. | 370/473 |
| 2005/0157805 A1 * | 7/2005 | Walton et al. | 375/267 |
| 2008/0062888 A1 * | 3/2008 | Lusky et al. | 370/252 |
| 2008/0304425 A1 * | 12/2008 | Karaoguz | 370/254 |
| 2009/0060060 A1 | 3/2009 | Stadelmeier et al. | |
| 2010/0046542 A1 * | 2/2010 | van Zelst et al. | 370/465 |
| 2010/0142591 A1 * | 6/2010 | Naguib | 375/141 |
| 2010/0220708 A1 * | 9/2010 | Mantravadi et al. | 370/343 |
| 2011/0142097 A1 * | 6/2011 | Walton et al. | 375/141 |
| 2011/0211662 A1 * | 9/2011 | Varadarajan et al. | 375/346 |
| 2011/0261899 A1 * | 10/2011 | Walton et al. | 375/295 |
| 2012/0044982 A1 * | 2/2012 | Sampath et al. | 375/228 |
| 2012/0114056 A1 * | 5/2012 | Jafarkhani et al. | 375/267 |
| 2014/0177767 A1 * | 6/2014 | Azadet et al. | 375/348 |

* cited by examiner

COMMUNICATION DEVICE USING SPATIAL DIVERSITY, COMMUNICATIONS SYSTEM AND METHOD

DESCRIPTION

An embodiment of the present invention relates to a communication device using spatial diversity, wherein channel state information is used for separating transmission and interference channels. Further embodiments relate to a communications system using spatial diversity based on channel state information feedback and to a method for operating a communications system using channel state information.

In wireless communications system, a conventional MIMO (Multiple-input multiple-output) approach concerns transmitting and receiving devices with several antenna elements at both the transmitter and the receiver side. MIMO systems use adaptive signal processing to exploit instead of mitigate the occurrence of multipath transmission. For example, MIMO systems may perform Eigenbeamforming in a downlink stream, wherein an uplink feedback device provides eigenbeamforming vectors to the downlink transmitter. In the downlink transmitter, an eigenmode generator generates an eigenbeamforming vector for each of a plurality of reproduced signals output from a signal reproducer at each sub-carrier on the basis of the eigenbeamforming vectors. The use of short-term and long-term eigenbeamforming vectors may reduce the amount of feedback information.

A powerline communications system may combine Eigenbeamforming with an adaptive orthogonal frequency division multiplex method to improve communications performance in a point-to-point communication link, wherein channel state information concerning the transmission channel is fed back from a receiving device to a transmitting device.

It is an object of the invention to improve performance of communication devices, methods and systems. The object is achieved with the subject-matter of the independent claims. Further embodiments are defined in the dependent claims respectively. Details of the invention will become more apparent from the following description of embodiments in connection with the accompanying drawings, wherein features of the various embodiments may be combined unless they exclude each other.

Figure 1A:
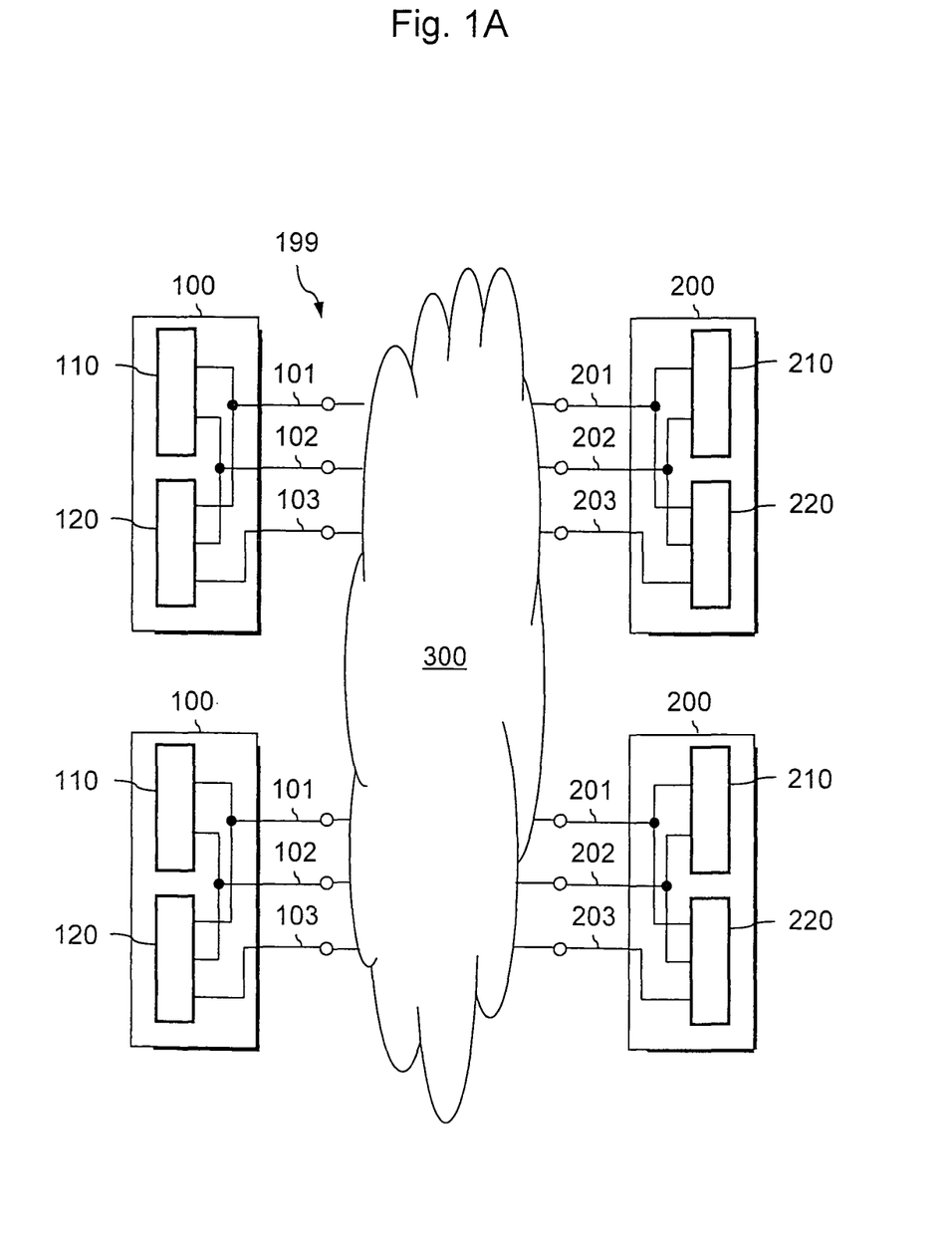
FIG. 1A is a schematic block diagram illustrating a MIMO communications system with four transmitting and receiving communication devices for two point-to-point communication links sharing a common transmission medium in accordance with an embodiment of the invention.

FIG. 1A illustrates a wireless or wired communications system 199. According to an embodiment, the communications system 199 may be an xDSL (generic Digital Subscriber Line) or a DVB-C2 (Digital Video Broadcasting-Cable) communications system, an ad-hoc network, for example a WLAN (wireless local area network) or a network of sensor devices like fire detectors. In accordance with another embodiment, the communications system 199 is a system using power distribution wires for data communications. For example, the communications system 199 is a power line communications (PLC), mains communications, power line telecommunications (PLT), broadband power line (BPL) or power band or power line networking (PLN) using a modulated carrier superimposed to the 50 or 60 Hz alternating current of the power lines respectively. The communications system 199 may be based on an OFDM (Orthogonal Frequency Division Multiplexing) modulation scheme.

The communications system 199 of FIG. 1A is a MIMO system with at least one first communication device 100 and at least two second communication devices 200 to establish at least two communication links which are independent from each other with regard to the transmitted data contents. Each first communication device 100 includes a transmitter unit 110 employing one, two or more transmit ports 101, 102. Each second communication device 200 includes a receiver unit 220 employing at least one, for example two, three or four, receive ports 201-203. A transmission medium 300 connects the transmit ports 101, 102 of each first communication device 100 with the receive ports 201-203 of each second communication device 200.

The first communication devices 100 may be exclusively transmitting devices with transmit ports 101, 102 only. According to other embodiments, at least one of the first communication devices 100 is a bidirectional device including, in addition to the transmitter unit 110, a receiver unit 120 which may be of the same type of the receiver unit 220 in the second communication devices 200, wherein the ports 101, 102 may be bidirectional ports and the first communication device 100 may comprise a further receive port 103.

The second communication devices 200 may be exclusively receiving devices. According to other embodiments, at least one of the second communication devices 200 may be a bidirectional device including, in addition to the receiver unit 220, a transmitter unit 210 which may be of the same type of the transmitter unit 110 in the first communication devices 100, wherein the ports 201, 202 may be bidirectional ports. The transmitter units 110, 210 of the first and second communication devices 100, 200 may be balanced, in other words, they may be configured to generate transmit signals using the same frequency range, the same modulation method and at least almost the same transmit power.

The communication devices 100, 200 may be stand-alone devices or may be integrated in electronic devices for consumer applications, for example, a storage unit, a television set, an audio receiver, a home server containing video or audio content, a router connected to the Internet, a computer, or a video recorder.

Though the communication devices of FIG. 1A may be almost identical, the data transmission quantity may be asymmetric in the application. For example, a server may transmit large data contents like movies to a television apparatus, whereas the television apparatus usually only sends comparatively short request and hand-shake messages to the server.

Figure 1B:
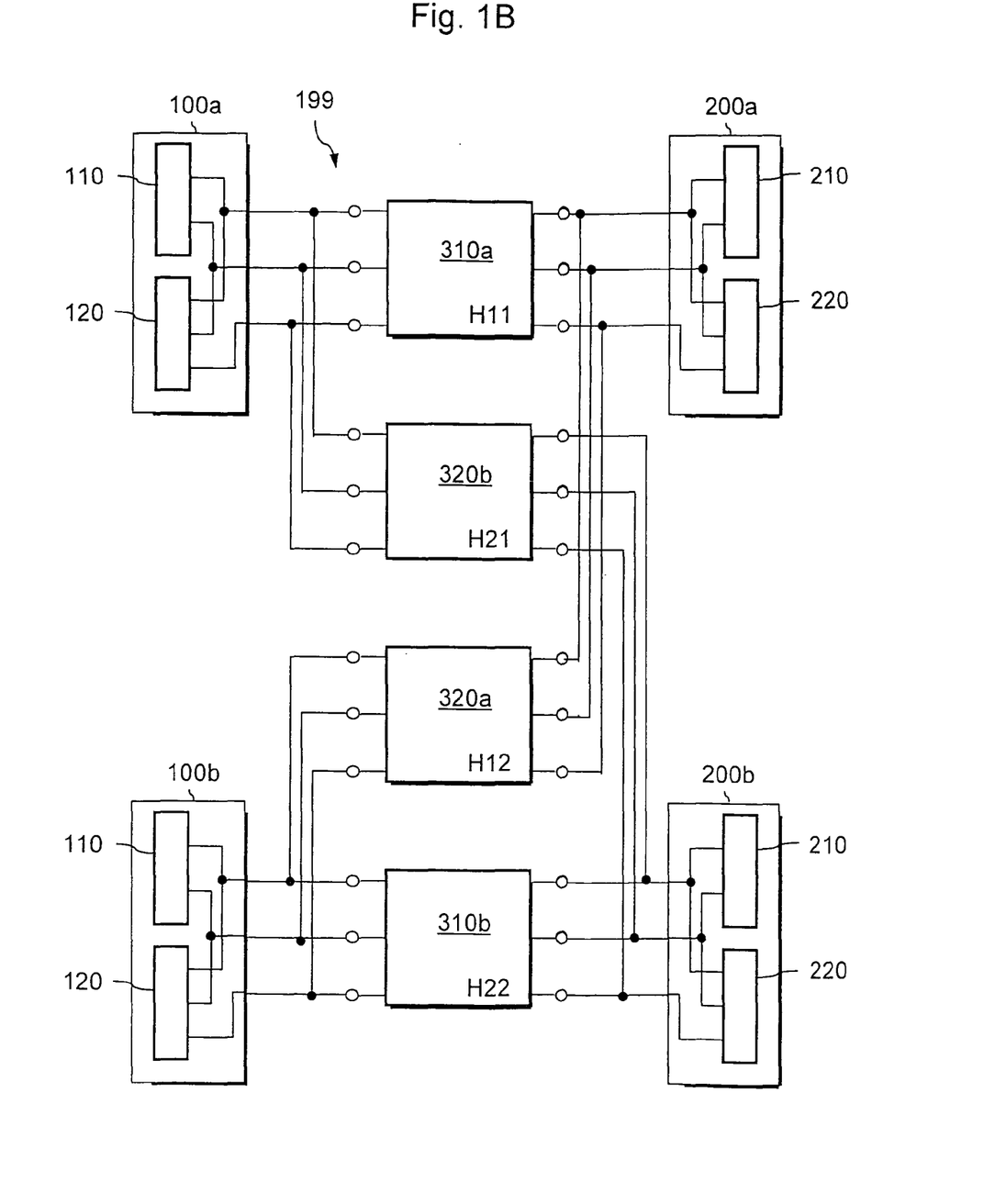
FIG. 1B is a schematic block diagram illustrating transmission and interference channels of the transmission medium of FIG. 1A.

FIG. 1B refers to an embodiment of the communication system 199 of FIG. 1A, where two independent point-to-point communication links share the transmission medium 300 of FIG. 1A. A first communication link is described by a first transmission channel 310a connecting a first one 100a of the first communication devices 100a, 100b with a first one 200a of the second communication devices 200a, 200b. A second communication link is represented by a second transmission channel 310b connecting the second one 100b of the first communication devices 100a, 100b with the second one 200b of the second communication devices 200a, 200b. Concerning data transmission from the first 100a, 100b to the second 200, 200b communication devices, since the communication links share the same transmission medium, a first interference channel 320a may occur that connects the second one 100a of the first communication devices 100a, 100b with the first one 200b of the second communication devices 200a, 200b, and a second interference channel 320b may occur that connects the first one 100b of the first communication devices 100a, 100b with the second one of the second communication devices 200a, 200b. According to an embodiment the transmission medium 300 is a multi-wire connection.

Figure 1C:
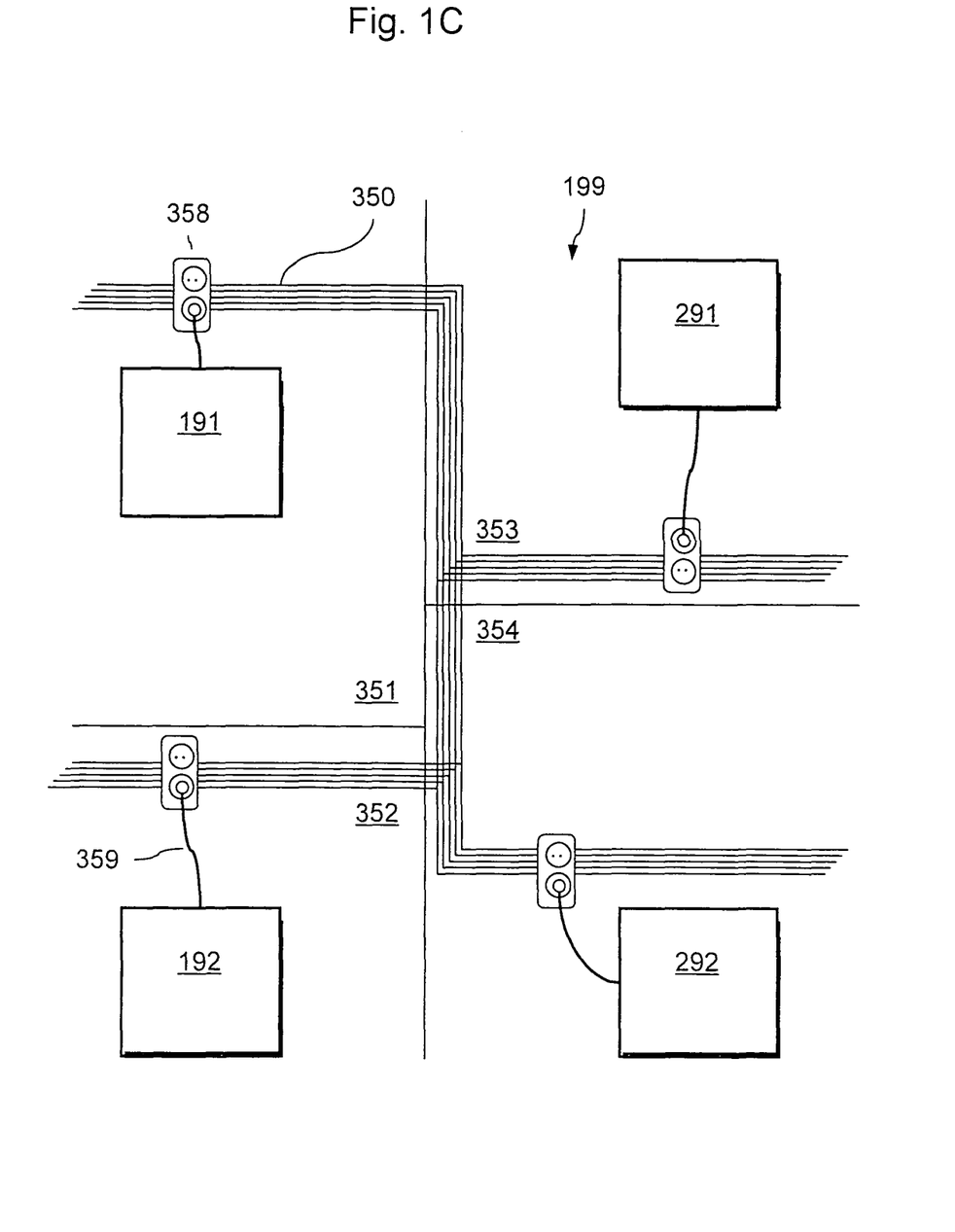
FIG. 1C is a schematic block diagram illustrating the MIMO communications system of FIGS. 1A and 1B according to an embodiment using an electric power wiring as transmission medium.

FIG. 1C refers to an embodiment of the communications system 199 of FIGS. 1A and 1B, where the transmission medium 300 includes an in-house electric power wiring 350 containing two or more electrical conductors used for transmission of AC (alternating current) electric power and installed as permanent wiring within buildings or buried in the ground. For example, the communications network 199 may include a home server 191 containing video, audio, or data content in a first room 351 and a router 192 connected to the internet in a second room 352. The home server 191 and the router 192 may include or correspond to the first communication devices 100a, 100b of FIG. 1B. The communications system 199 may further include a home computer 291 in a third room 353 and a television apparatus 292 in a fourth room 354. The home computer 291 and the television apparatus 292 may include or correspond to the second communication devices 200a, 200b of FIG. 1B. Line cords 359 plugged into power outlets 358 connect the home server 191, the router 192, the home computer 291 and the television apparatus 292 with the in-house electric power wiring 350. The home server 191 may transmit a first video stream to the home computer 291 and, simultaneously, the router 192 may transmit a second video stream to the television apparatus 292. The first and second video streams may be different video streams. The signals may interfere with each other on the power wiring 350.

Referring again to FIG. 1B, in this case the first communication devices 100a, 100b in substance act as transmitting devices and the second communication devices 200a, 200b mainly act as receiving devices. Each of the transmitting devices may simultaneously transmit a plurality of m transmit signals $t_x$ with x=1, . . . m on its m transmit ports. The m transmit signals $t_x$ define a transmit vector $t_m$, for each transmitting device. Each transmit vector $t_m$ of a plurality of p transmitting devices defines a transmit symbol vector $s_i$ with i=1, . . . p. Each receiving device receives via its n receive ports n receive signals $r_y$ with y=1, . . . n defining a receive vector $r_n$ for each receiving device. Each receive vector $r_n$ of a plurality of q receiver devices defines a receive symbol vector $r_j$ with j=1, . . . , q.

For example, each transmitting device may supply two differential transmit signals $t_x$ using the live or phase wire (L, P), the neutral wire (N), and protective earth (PE), wherein the differential transmit signals $t_x$ are modulated on a carrier superposing the AC frequency of the mains voltage. A receiving device may receive three differential receive signals between live wire and neutral wire, between neutral wire and protective earth, and between live wire and protective earth. According to another embodiment, the receiving device may receive the three differential receive signals and a common mode signal resulting from a leakage current from the wiring as a fourth receive signal.

When the transmit signals $t_x$ share the same transmission medium, they may interfere with each other, for example through capacitive coupling between the wires. In a channel matrix $H_{n,m}$, which describes the receive vector $r_n$ as a function of the transmit vector $t_m$, the entries of each line describe one of the receive signals $r_y$ in dependence of all transmit signals $t_x$, wherein typically none of the entries $h_{i,j}$ of $H_{n,m}$ is equal 0 when crosstalk occurs.

$$r_n = H_{n,m} t_m \qquad (1)$$

In a point-to-point communication link, the principle of beam-forming can be used for enhancing the SNR (signal-to-noise ratio) by pre-coding the transmit vector with a single-link precode matrix $T_{m,m}$ such that from the resulting equivalent channel matrix $H_{n,m} T_{m,m}$ and a single-link decoder matrix at the receiver side, a diagonal matrix can be obtained. In the diagonal matrix each receive signal depends on only one single transmit signal such that the receive signals are decoupled from each other.

Alternatively or in addition to that approach, the embodiments of this invention use the principle of spatial diversity in MIMO systems for separating different users or communication links in the spatial domain. In a multi-link environment, each of p transmitting devices transmits a transmit symbol vector $s_i$, each of q receiving devices receives a receive symbol vector $r_j$, and a plurality of channel matrices $H_{ji}$ identify the corresponding channel matrices H between the j-th receiving devices and the i-th transmitting device.

Referring again to the embodiment of FIG. 1B, the first one 100a of the first communication devices transmits a transmit symbol vector $s_1$ and, contemporaneously, the second one 100b of the first communication devices transmits a second transmit symbol vector $s_2$. The first one 100a of the first communication device may use a first single-link precoding matrix $T_1$ and the second one 100b of the first communication devices may use a second single-link precoding matrix $T_2$ for precoding the transmit symbol vector. The first one 200a of the second communication devices receives a first receive symbol vector $r_1$ composed of a component received via the first transmission channel 310a with the channel matrix $H_{11}$ and originating from the first precoded transmit symbol vector $s_1$. The first one 200a of the second communication devices also receives another component via the first interference channel 320a with the channel matrix $H_{12}$ and originating from the second precoded transmit symbol vector $s_2$.

$$r_1 = H_{11} T_1 s_1 + H_{12} T_2 s_2 \qquad (2)$$

In equation (2), the term $H_{12}T_2s_2$ is the interference term caused by the transmit signals of the second one 100b of the first communication devices. Using matrix connotation, equation (2) can be rewritten as follows:

$$r_1 = [\, H_{11}T \quad H_{12}T_2 \,]\begin{bmatrix} s_1 \\ s_2 \end{bmatrix} \quad (3)$$

Since the channel characteristics are frequency-dependent, for a multi-carrier system like OFDM all matrix operations have to be applied for each carrier separately. With the abbreviations $$H_1 = [\, H_{11} \quad H_{12} \,],\, T = \begin{bmatrix} T_1 & 0 \\ 0 & T_2 \end{bmatrix} \text{ and } s = \begin{bmatrix} s_1 \\ s_2 \end{bmatrix}$$

equation (3) reads $$r_1 = H_1 T s \quad (4)$$

According to an example, the transmitting devices send different symbols over each of two transmit ports and the transmit symbol vectors s1 and s2 are 2×1 vectors, whereas each receiving device 200a, 200b receives at four receive ports. In this case $H_1T$ is a 4×4 matrix.

For recovering the original transmit signals, the receiving device may use a zero forcing approach, according to which a multi-link decoding matrix $W_1$ is developed that compensates for the effect of $H_1T$ on the transmit signals:

$$W_1 = (H_1 T)^p = T^{-1} H_1^p = \begin{bmatrix} T_1^{-1} & 0 \\ 0 & T_2^{-1} \end{bmatrix} H_1^p \quad (5)$$

In equation (5) index p denotes the pseudo inverse matrix.

Alternatively, the receiving devices may be MMSE (minimum mean square error) receivers, ML (maximum likelihood) receivers or SUC (successive cancellation) receivers.

According to an embodiment only the rows concerning one of the transmit symbol vectors or transmit signals are calculated. For example, in the embodiment of FIG. 1B, the first receiving communication device 200a may be adapted to only decode the transmit signal of the first one 100a of the first communication devices, and is not adapted to decode the signal send from the second one 100b of the first communication devices.

Figure 2A:
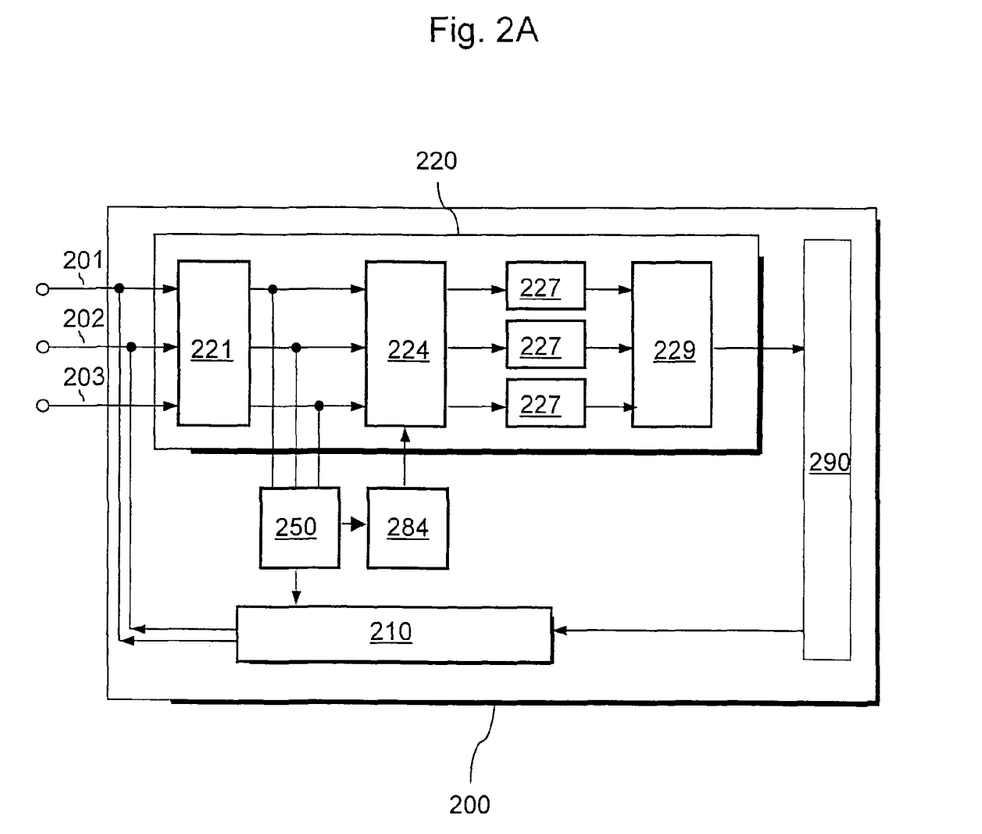
FIG. 2A is a schematic block diagram illustrating a communication device with a receiver unit including a multi-link decoder unit for spatial diversity decoding in accordance with another embodiment of the invention.

FIG. 2A shows a communication device 200 including a receiver unit 220 in more detail. The communication device 200 receives receive signals at one, two, three, four or more receive ports 201-203. The receive ports 201-203 may be antennas for receiving electromagnetic waves. According to an embodiment, the receive ports 201-203 are wire connectors, for example, connectors to a communications wiring or to an electric power wiring.

According to an embodiment, the communication device 200 may have three receive ports 201-203 configured to receive differential signals between the live and neutral wires, between the live wire and protective earth and between the neutral wire and protective earth. According to another embodiment, the communication device 200 further comprises a fourth receive port configured to receive a common mode signal caused by a leakage current.

A receiver unit 220 recovers from the at least one receive signal at least a first transmit signal transmitted to the communication device 200 via a transmission channel connecting the communication device 200 with a transmitting communication device with which the communication device 200 establishes a point-to-point communication link. The receiver unit 220 may include an input signal processing unit 221 that may condition and sample analogue receive signals to obtain two or more, for example four, digital receive signals. The signal levels of the receive signals may be adjusted in response to information included in the received signals. According to an embodiment, the input signal processing unit 221 may transform the digital receive signals into the frequency domain, wherein for each digital receive signal a digital data stream may be generated. Amplitude and phase information may be obtained from the receive signals for further adjusting the signal levels. In embodiments referring to multi-carrier transmission techniques, the input signal processing unit 221 may use OFDM to decompose, in the frequency domain, each data stream into orthogonally modulated components. According to an embodiment, synchronization information included in the receive signals may be used for demodulation.

A multi-link decoder unit 224 receives and decodes the digital data containing orthogonal components for each receive signal path. To this purpose, the multi-link decoder unit 224 uses a multi-link decoder algorithm that uses parameters derived from a first channel state information describing the transmission channel and second channel state information describing at least one interference channel via which one or more second transmit signals arrive at the communication device 200. According to an embodiment referring to a zero-forcing approach, the multi-link decoder algorithm may be based on the multi-link decoder matrix W, which entries are derived from the first and second channel state information in the way described above.

The information required for configuring the multi-link decoder unit 224 may be input by a user via a user interface, may be in included in information the communication device 200 receives via a further data interface or may be contained in a preamble field or a payload data field of signals received via the receive ports 201, 202, 203, 204. In accordance with an embodiment, the communication device 200 includes a channel estimation unit 250 that estimates the first and second channel state information, for example on the basis of training symbols contained in the transmit signals.

Typically, a predefined set of training symbols is known at both the transmitter and the receiver side and the training symbols are used for channel estimation. For example, the channel estimation unit 250 may compare symbols or signals contained in the receive signals and transmitted by the transmitting device, with which the communication device 200 establishes a communication link, with equivalent nominal signals and may determine a channel matrix of a transmission channel of the communication link on the basis of the result of the comparison. For example the channel estimation unit 250 may select, from a plurality of predefined channel matrices, that one that models best the actual transmission channel.

The training symbols sent by each transmitting device (or each transmit port) can be separated in time or they can be orthogonal to each other such that they can be transmitted simultaneously. According to an embodiment referring to a communications system including at least the communication device 200 and two other transmitting communication devices, one of the communication devices of the communications system transmits a time stamp, which is received by the other communication devices. The time stamp identifies a point in time allowing all transmitting communications devices to send training symbols simultaneously and allowing all receiving communication devices to estimate the transmission and interference channels from the corresponding receive signals. Synchronization may be coupled to the line cycle to make sure that all transmitters are synchronized in the channel estimation phase.

In multi-carrier systems where the receiver unit 220 is adapted to receive and decode multi-carrier receive signals, for example in an OFDM system, for each transmitting device with which the communication device 200 establishes a communication link, the channel state information includes information on each sub-carrier used in the multi-carrier receive signal and each sub-carrier may be assigned to a channel matrix.

The channel estimation unit 250 may output the channel state information to a decoder control unit 284. Based on the received channel state information, the decoder control unit 284 determines parameters of a decoder algorithm, the entries of the decoder matrix W, or the parameters required for MMSE, SUC, or ML decoding. For example, the decoder control unit 284 may calculate the entries of the decoder matrix W or may select, from a plurality of predefined decoder matrices, that one that fits best with the searched decoder matrix. The decoder control unit 284 configures the multi-link decoder unit 224 to recover the transmit signal of the established communication link by using receive signals received via at least two different receive ports 201, . . . , 204.

According to an embodiment, the channel estimation unit 250 may output the channel state information describing the channel matrix for further processing to further units of the communication device 200. According to an embodiment, the communication device 200 includes an output unit for outputting the first and/or second channel state information. The output unit may be a second wireless or wired interface.

According to an embodiment, the communication devices 200 includes a transmitter unit 210 configured to transmit outbound transmit signals to the corresponding device of the communication link on the first transmission channel. The outbound transmit signals are balanced to the receive signals with respect to frequency range, modulation method and transmit power, in other words, the outbound transmit signals may use the same frequency range, the same modulation techniques and almost the same transmit power as the transmit signals transmitted by the other communication device of the communication link. According to an embodiment, the transmitter unit 210 is used as output unit for outputting the channel state information.

For example, the transmitter unit 210 transmits the channel state information or information derived therefrom, for example tonemap or beamforming information, to one or more other communication devices sharing the same transmission medium. The other communication devices may use the channel state information for deriving suitable pre-code matrices or adaptive sub-carrier assignment techniques.

Demodulators may demodulate each of the data streams output by the multi-link decoder unit 224. The demodulators 227 may be quadrature amplitude demodulators (QAD) generating a demodulated data signal, which may be output to a demultiplexer unit 229 that combines the demodulated data signals to one, two or more data streams which are transmitted to a control unit 290 for further processing.

Figure 2B:
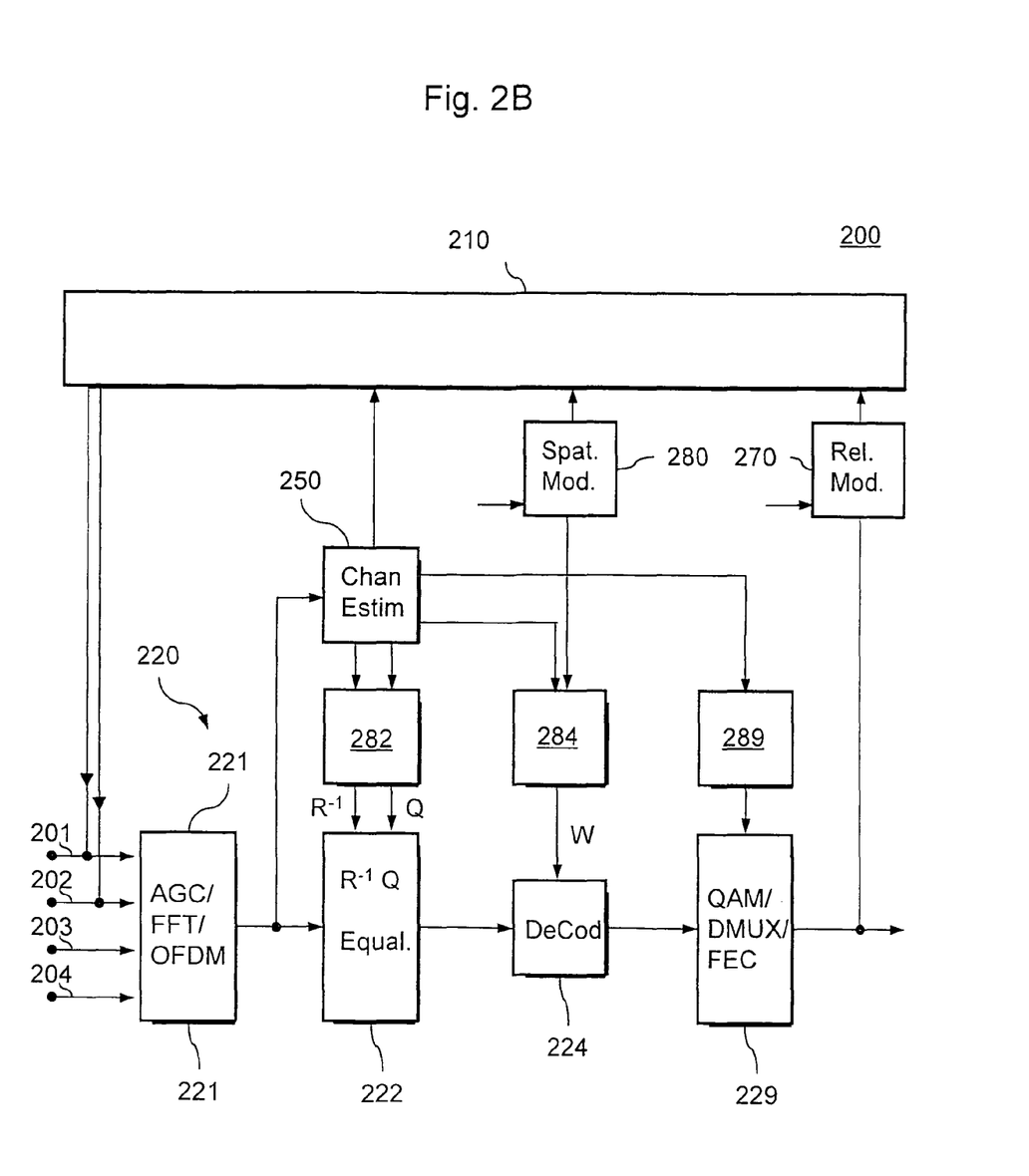
FIG. 2B is a schematic block diagram illustrating a communication device with a receiver unit including both a multi-link decoder unit for spatial diversity decoding and a relay control unit in accordance with another embodiment of the invention.

FIG. 2B refers to a further embodiment of a communication device 200 for a powerline application providing multi-link decoding in the frequency domain. The communication device 200 includes four receiver ports 201, 202, 203, 204 to receive signals via an electric power wiring. For example, a communication link is established between a transmitting device and the communication device 200 as receiving device. The transmitting device transmits two differential signals between two different pairs of electric power wires and the communication device 200 receives three differential signals between three different pairs of electric power wires and a common mode signal. Simultaneously, a further transmitting device with which the communication device 200 does not establish a communication link may transmit signals to another receiving communication device. The signals transmitted from the two transmitting devices interfere in the electric power wiring.

An input signal processing unit 221 samples the analogue receive signals and Fourier transforms the digitalized receive signals into the frequency domain. For OFDM systems, the input signal processing unit 221 may decompose the transformed data streams into orthogonally modulated components.

A channel estimation unit 250 determines channel state information. For example, it may determine first channel state information related to the transmission channel, for example, the entries of a channel matrix describing the mutual effects between the receive signals assigned to the established communication link. In addition or alternatively, the channel estimation unit 250 may determine a tone map describing frequency characteristics of each path of the transmission channel of the established communication link. In addition or alternatively, the channel estimation unit 250 estimates also second channel characteristics assigned to interference channels between the communication devices 200 and further transmitting devices, with which the communication device 200 does not establish a communication link.

A pseudo inversion unit 282 may use information obtained by the channel estimation unit 250 to determine coefficients of an equalizer unit 222.

A decoder control unit 284 may use the transmission channel matrix and the second channel state information to determine coefficients of a multi-link decoder unit 224. According to an embodiment, the multi-link decoder control unit further receives spatial mode information describing the number of spatial modes assigned to each communication link the receiver device establishes and controls the multi-link decoder unit 224 to apply the multi-link decoder algorithm on the basis of both the channel state and the spatial mode information.

A communication link to which the communication device 200 is assigned may or may not use single-link precoding where Eigenbeamforming is used to overcome issues in a point-to-point connection. Where single-link precoding/decoding is applied, the precoding of communication links may be provided independent from each other if the precode matrices T are square matrices, for example for two receive and two transmit signals. Otherwise the precoding is not independent, for example in the case of three communication links with one spatial mode for each communication link. In such cases, the precode matrices have to be determined for all users simultaneously. Criteria for determining the precode matrices may be reduction of interference to other communication links, throughput maximization of the actual link or a trade-off between those to get a fair bitrate for each user pair, wherein bitrate requirements for each link may be considered. Where single-link precoding/deconding is not used, matrices $T_1$, $T_2$ in equation (2) correspond to diagonal matrices and can be discarded.

A demodulator control unit 289 may use information, for example tonemap information obtained by the channel estimation unit 250 to determine coefficients for a demodulator unit 229. Further, the information obtained by the channel estimation unit 250 may be fed back to the transmitting communication devices that transmit the currently received signals. The equalizer unit 222 resumes equalized data streams from the orthogonal data streams assigned to each receiver port 201, 202, 203, 204.

The multi-link decoder unit 224 decodes the data streams using a multi-link decoder algorithm, for example zero-forcing, MMSE, SUC or ML, which parameters are set by the multi-link decoder control unit 284. The multi-link decoder unit 224 decodes the receive signals using a multi-link decoder algorithm whose parameters are derived from a first channel state information describing the transmission channel and second channel state information describing at least one interference channel via which one or more second transmit signals arrive at the communication device 200 in order to recover from the four receive signals at least a first transmit signal transmitted from the transmitting device of the established communication link. Where single-link precoding is used, the multi-link decoder unit 224 inherently considers the precode matrices and decodes accordingly. Using spatial diversity allows further possibilities to separate communication links using the same transmission media and increases bitrate for each communication link.

According to an embodiment, the multi-link decoder unit 224 recovers only that receive signal assigned to the transmission channel of the currently established communication link. According to another embodiment, the multi-link decoder unit 224 recovers at least one signal assigned to one of the interference channels, in other words, to a transmitting device to which no communication link is established.

The demodulator unit 229 may perform a QAM demodulation that may or may not use tonemap information and may recombine the receive signals to a resulting receive signal. The demodulator unit 229 may further perform forward error correction using included code redundancy for detecting and correcting data errors.

The communication device 200 may include a transmitter unit 210 transmitting outbound transmit signals, for example to the corresponding transmitting device of the communication link. The outbound transmit signals are balanced to the receive signals with respect to frequency range, modulation method and transmit power, in other words, the outbound transmit signals may use the same frequency range, the same modulation techniques and the same transmit power range as the transmit signals transmitted by the transmitting communication device of the communication link. According to an embodiment, the transmitter unit 210 outputs also channel state information, for example for adaptive sub-carrier assignment and beamforming approaches.

The communication device 200 may further include a relay control unit 270 which may be switched between an active and an inactive mode, for example, in response to a command received via the receive unit 220. In addition, the relay control unit 270 may be configurable and may receive relay information on a communication link to be relayed. For example, the relay control unit 270 receives and stores identification information identifying a transmitting and a receiving device in a communication link to be relayed.

According to an embodiment, the multi-link decoder unit 224 recovers from the receive signals at least a second transmit signal arriving at the communication device via one of the interference transmission channels. The relay control unit 270 forwards the received second transmit signal to the transmitter unit 210. This allows the communication device 200 to be effective as a relay. Especially if the distance between the transmitting device and the receiving device in the communication link to be relayed is large and highly attenuated and if the communication device 200 is located somewhere between those devices, the relay links might be less attenuated and the communication via the relay improves the communication in the second communication link.

According to an embodiment, the communication device 200 receives the spatial mode information from another device, for example via the receive ports 201, 202, 203, 204. According to a further embodiment, the communication device 200 further comprises a spatial mode control unit 280 for generating the spatial mode information and for transmitting it to the multi-link decoder control unit 284. According to an embodiment, the spatial mode information is generated on the basis of bitrate requirements for each communication link and/or channel state information concerning each communication link, such that at least one communication link with high bit rate requirements and/or channel state information indicating low transmission performance is assigned to a higher number of spatial modes than another communication link with lower bitrate requirements and/or channel state information indicating higher transmission performance.

The number of receive ports 201, 202, 203, 204 limits the spatial modes available for the separation of different transmitting devices. For four receive ports the maximum number of available spatial modes is four, where each two may be used for two different transmitting devices. More general if $S_1$ is the number of spatial modes used by user pair i or communication link i, up to i communication links can be separated. With k being the total number of communication links equation (11) holds:

$$\sum_{i=1}^{K} S_i \leq N \tag{11}$$

In addition, the maximum number of spatial modes for each transmitter is limited by the number of its transmit ports.

For a communications system using transmitting communication devices with two transmit ports, with NCL denoting the total number of communication links, NSM1 denoting the number of spatial modes $S_1$ assigned to the first communication link, NSM2 denoting the number of spatial modes $S_2$ assigned to the second communication link, NSM3 denoting the number of spatial modes $S_3$ assigned to the third communication link, and NSM4 denoting the number of spatial modes $S_4$ assigned to the fourth communication link, table A gives possible configurations for a receiving communication device with four receive ports and table B gives possible configurations for a receiving communication device with three receive ports:

TABLE A

| | N = 4 | | | |
|---|---|---|---|---|
| NCL | NSM1 | NSM2 | NSM3 | NSM4 |
| 2 | 2 | 2 | 0 | 0 |
| 3 | 2 | 1 | 1 | 0 |
| 3 | 1 | 2 | 1 | 0 |
| 3 | 1 | 1 | 2 | 0 |
| 4 | 1 | 1 | 1 | 1 |

TABLE B

| | N = 3 | | |
|---|---|---|---|
| NCL | NSM1 | NSM2 | NSM3 |
| 2 | 2 | 1 | 0 |
| 2 | 1 | 2 | 0 |
| 3 | 1 | 1 | 1 |

The number of spatial modes available for a communication link is determined based on bitrate requirements and/or channel conditions for each communication link. The determination may be made by an operator installing or re-installing a communications system. According to another embodiment, the determination can be made in the communications system in a configuration phase or during an operational phase.

The spatial mode control unit 280 may further be adapted to disable all functions concerning SDD (spatial diversity duplex), for example, if the bit rate obtainable for a certain communication link by SDD is less than can be expected for other approaches, for example TDD (time diversity duplex) or FDD (frequency diversity duplex), such that the communication device 200 may switch to TDD/FDD.

Figure 3:
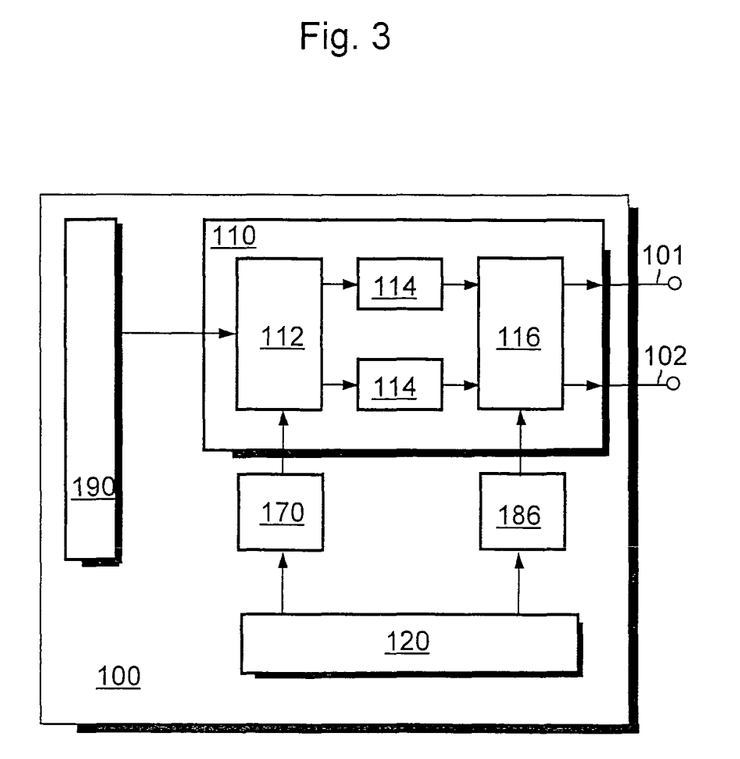
FIG. 3 is a schematic block diagram illustrating a communication device with a transmitter unit including a spatial mode controller unit in accordance with another embodiment of the invention.

FIG. 3 shows a transmitting communication device 100 in more detail. A control unit 190 may output a data stream to a transmitter unit 110. The transmitter unit 110 may include a serial-to-parallel multiplexer 112 splitting or multiplying the data stream into a number M of parallel data streams. The number M of data streams is equal to or less than the minimum of the number m of transmit ports and the number n of receive ports, M≤min[n, m]. For example in a system with two transmit ports and three receiving ports, the number M of data streams is equal one or equal two. A MISO system using one receive port uses only one data stream. The serial-to-parallel multiplexer 112 may be programmable with respect to the number of transmit ports assigned to the same data stream.

For example, the communications device 100 may include a spatial mode control unit 170 which receives spatial mode information from other communications devices participating in the same communications system and which may program or configure the serial-to-parallel multiplexer 112 in accordance with the received spatial mode information. The spatial mode control unit 170 may assign to each transmit signal the number of spatial modes. For example the spatial mode control unit 170 may assign a number of transmit ports to each communication link. For example, in a powerline communications system providing two independent transmit ports, the spatial mode control unit 170 may assign either one or two transmit ports to each established communication link. The spatial mode control unit 170 may receive spatial mode information via a receiver unit 120 as illustrated in FIG. 1A or via an alternate transmission path.

Each of the data streams is transmitted to one of M modulators 114 respectively. The modulators 114 may be quadrature amplitude modulators (QAM) and each modulator 114 generates a modulated data transmit signal.

The transmitter unit 110 may include a precoder unit 116 precoding (beamforming) the modulated data signals according to a beamforming scheme as discussed above to generate the precoded transmit signals. The precoder unit 116 may be characterized by coefficients derived from a precode matrix T. The precoder unit 116 may be programmable to realize different precode matrices. For example, during a learning phase, the precode matrix may be the identity matrix such that the precoder unit 116 is transparent for the modulated data signals $t_x$. During an operational phase, the precode matrix T may approximately be equal to the second unitary matrix V.

A precoder control unit 186 in the first communication device 100 may receive information for determining the precode matrix T, for example via the receiver unit 120, and may be used to configure the precoder unit 116. According to an embodiment, the precoder control unit 186 selects for each channel one of a plurality of predefined matrices stored in a codebook unit.

Figure 4:
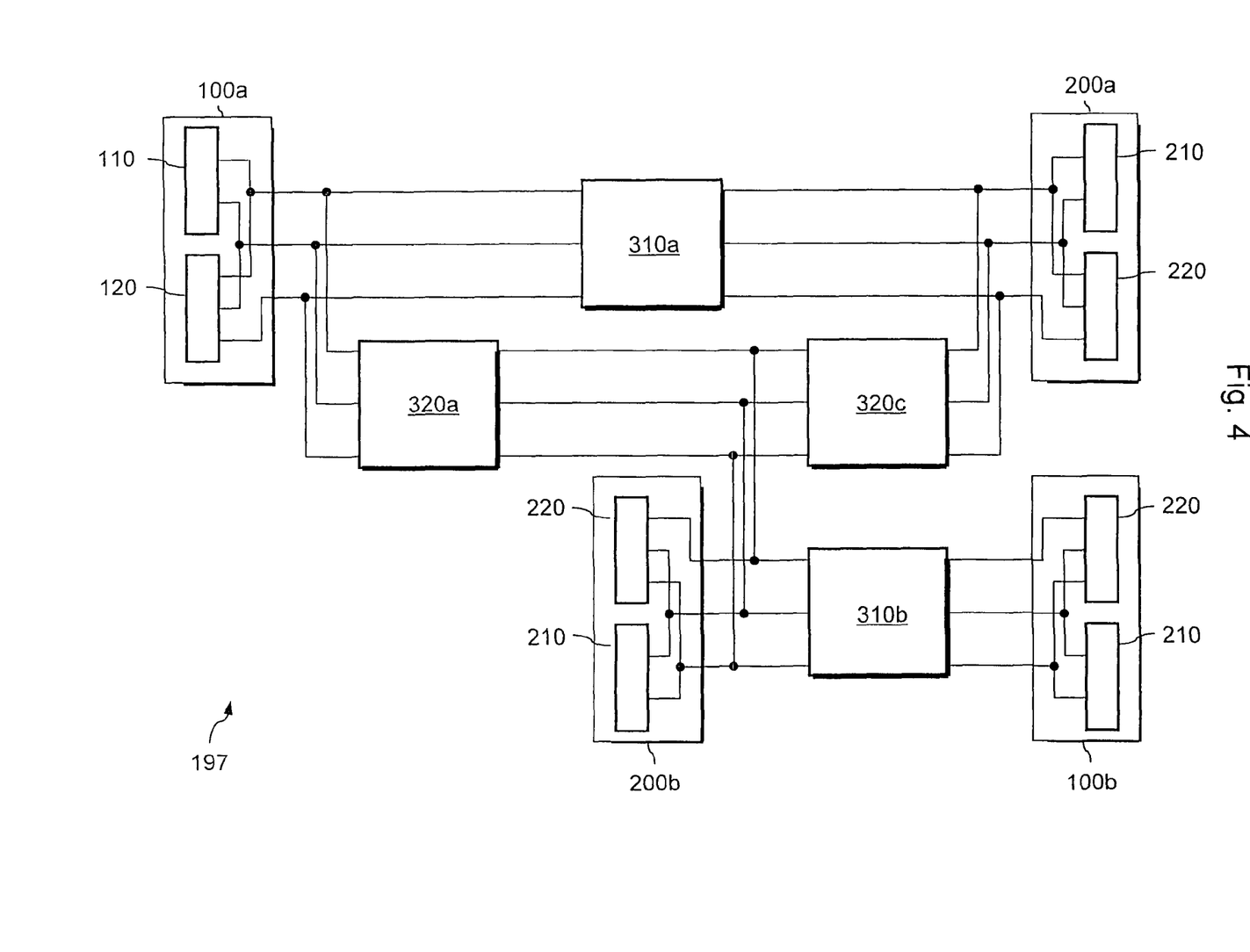
FIG. 4 is a schematic block diagram illustrating a communications system with a relay functionality according to an embodiment of the invention.

FIG. 4 refers to an embodiment concerning a cooperative communications system 197. A first communication link with a first transmission channel 310a is established between a transmitting communication device 100a and a receiving communication device 200a. A relay communication device 200b is linked to the same transmission medium the first communication link uses such that a first interference channel 320a is formed between the transmitting communication device 100a and the relay communication device 200b and a second interference channel 320b is formed between the relay communication device 200b and the receiving communication device 200a. The relay communication device 200b may or may not establish a second communication link with a further transmitting or receiving communication device 100b.

The relay communication device 200b may include an activated relay control unit, such that the fourth communication device 200b recovers, from the signals received via the first interference channel 320a, the transmit signal of the transmitting communication device addressed to the receiving communication device 200a. The relay communication device 200b forwards the received transmit signals via the second interference channel 320b to the receiving communication device 200a, for example via transmit ports other than the ports used for receiving. The relay communication device 200b is effective as a relay. Especially if the distance between the transmitting 100a and receiving 200a communication devices is large, the first transmission channel may strongly attenuate the transmit signals. If the relay communication device 200b is located between the devices of the first communication link, both interference channels 320a, 320b may have less attenuation.

Figure 5A:
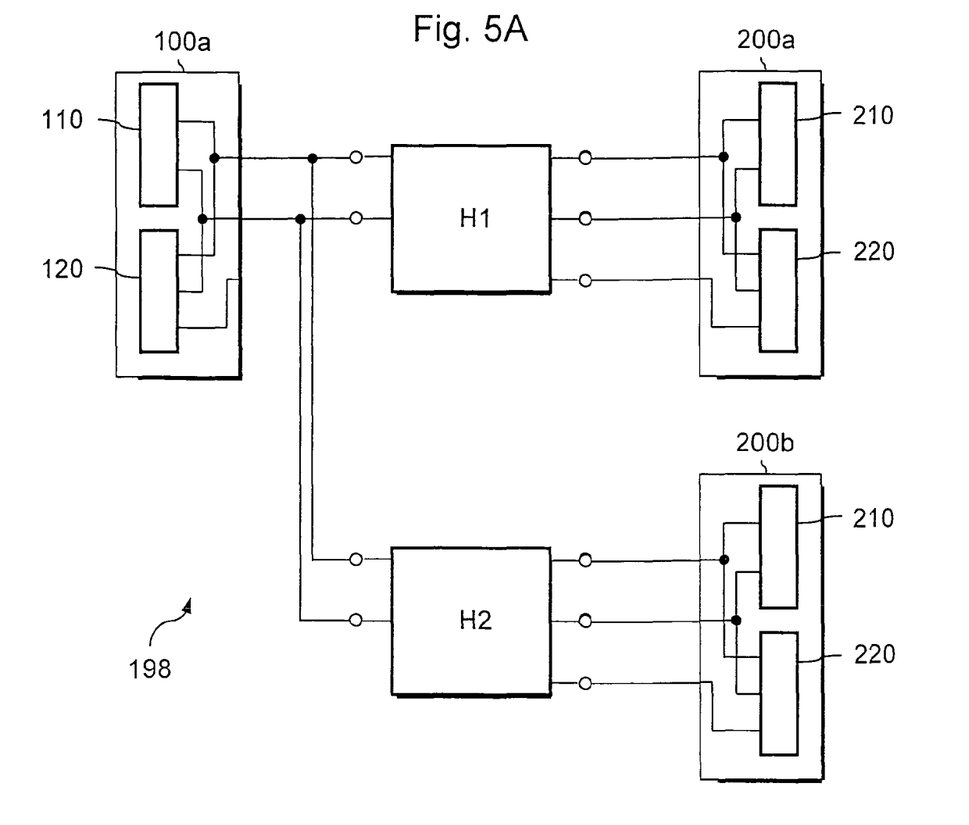
FIG. 5A is a schematic block diagram illustrating a communications system with a communication device establishing two point-to-point communication links with two further communication devices according to a further embodiment.
Figure 5B:
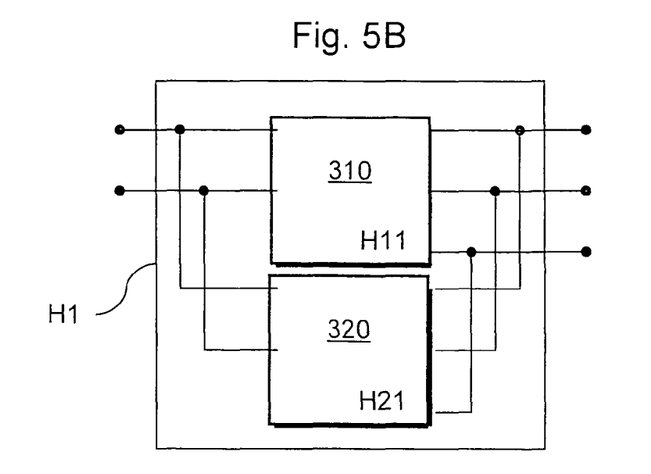
FIG. 5B is a schematic block diagram illustrating one of the transmission channels of FIG. 5A in more detail.

FIG. 5A refers to a communications system where the same transmitting communication device 100a simultaneously establishes two communication links, a first one with the receiving first communication devices 200a and a second one with the receiving second communication device 200b. The transmitting communication device 100a may include two or more independent transmit ports allowing two or more spatial modes which can be used to separate the transmit signals to the first and second receiving communication devices 200a, 200b. Since only one of the transmit signals is assigned to each receiver communication device, for example the first channel H1 contains a transmission channel H11 and an interference channel H21 as illustrated in FIG. 5B.

Figure 6:
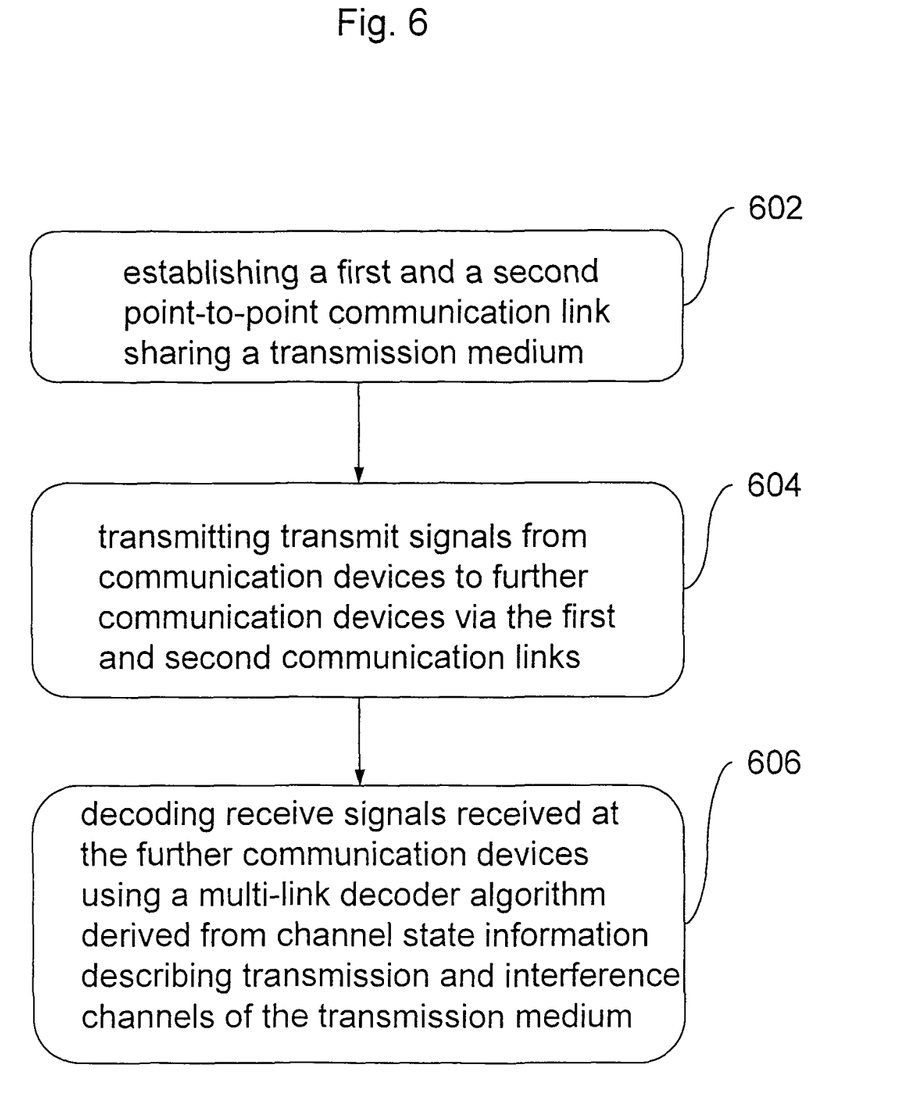
FIG. 6 is a simplified flow chart illustrating the method for operating a communications system in accordance with another embodiment.

FIG. 6 refers to a method of operating a communications system. In the communications system, at least a first point-to-point communication link between a first communication device and a second communication device via a multi-path transmission medium and a second point-to-point communication link between the first or a third communication device and a fourth communication device via the multi-path transmission medium are established (602). From the first or the first and the third communication devices transmit signals are transmitted (604). Receive signals received at the second and fourth communication devices are decoded using a multi-link decoder algorithm or multi-link decoder matrix derived from first and second channel state information describing transmission and interference channels of the multi-path transmission medium (606).

According to an embodiment, to each communication link a number of spatial modes may be assigned on the basis of bit rate requirements and channel performance in each communication link, such that the transmit signals are transmitted from the first and third communication devices in accordance with the number of spatial modes respectively. The decoder algorithm or decoder matrix is derived from the channel state information describing the transmission and interference channels and the number of spatial modes assigned to the respective communication link.

The invention claimed is:

1. A communication device comprising:
   at least one receiver port configured to receive a receive signal; and
   a receiver unit configured to recover from the at least one receive signal at least a first transmit signal transmitted to the communication device via a transmission channel; the receiver unit including
   a decoder unit configured to decode the receive signals using a multi-link decoder algorithm using parameters derived from a first channel state information describing a wired transmission channel and second channel state information describing at least one interference channel via which one or more second transmit signals arrive at the at least one receiver port of the communication device, the one or more second transmit signals including other data content than the first transmit signal.

2. The communication device of claim 1, comprising:
   at least two receiver ports configured to simultaneously receive receive signals respectively, wherein
   the decoder unit is configured to decode the receive signals using a multi-link decoder matrix in which entries are derived from the first and second channel state information.

3. The communication device of claim 1, further comprising:
   a channel estimation unit configured to estimate the first and second channel state information using training symbols contained in the transmit signals; and
   a decoder control unit configured to configure the decoder unit to apply the multi-link decoder algorithm or the multi-link decoder matrix.

4. The communication device of claim 3, wherein the decoder control unit is further configured:
   to receive spatial mode information describing a number of spatial modes assigned to each transmitting device with which the communication device establishes a point-to-point communications link; and
   to configure the decoder unit to apply a multi-link decoder algorithm or a multi-link decoder matrix derived on the basis of the first and second channel state information and the spatial mode information.

5. The communication device of claim 4, further comprising:
   a spatial mode control unit configured to generate the spatial mode information on the basis of bitrate requirements for each communication link and/or channel state information concerning each communication link, the communication device is assigned such that at least one communication link with higher bitrate requirements and/or channel state information indicating lower transmission performance is assigned to a higher number of spatial modes than another communication link with lower bitrate requirements and/or channel state information indicating higher transmission performance.

6. The communication device of claim 1, wherein
   the receiver unit is configured to receive and decode multi-carrier signals, and
   the channel state information includes channel estimation information about carriers used in the multi-carrier signals.

7. The communication device of claim 1, further comprising:
   an output unit configured to output at least the first channel state information or the first and the second channel state information.

8. The communication device of claim 1, wherein
   the receiver unit is configured to recover the first transmit signal by using receive signals received via at least two different receive ports.

9. The communication device of claim 1, wherein
   the receiver unit is configured to receive the receive signals via an electric power wiring.

10. The communication device of claim 1, further comprising:
    a transmitter unit configured to transmit outbound transmit signals on the wired transmission channel, the outbound transmit signals being balanced to the receive signals with respect to frequency range, modulation method, and transmit power.

11. The communication device of claim 10, wherein
    the receiver unit is further configured to recover from the at least one receive signal a second transmit signal arriving at the communication device via one of the interference transmission channels.

12. The communication device of claim 11, further comprising:
    a relay unit configured to forward the recovered second transmit signal to the transmit unit when a relay function is enabled.

13. A transmitting communication device configured to communicate via a wired transmission channel with a receiving communication device of claim 1, comprising:
    at least two transmit ports configured to simultaneously transmit transmit signals;
    a transmitter unit configured to generate the transmit signals, and
    a spatial mode control unit configured to receive spatial mode information describing a number of spatial modes assigned to a communication link the transmitting communication device establishes with the receiving communication device and to control a number of transmit ports used for the communication link on the basis of the received spatial mode information.

14. The communication device of claim 13, further comprising:
    a single-link precoder unit assigned to the communication link and configured to eigenbeamform the transmit signals, wherein a pre-coded transmit signal is derived from a signal to be transmitted by using a pre-code matrix derived from the first channel state information describing the respective transmission channel of the communication link.

15. The communication device of any of claim 13, wherein the communication device is further configured to start transmission of training symbols at a defined timing after reception of a time stamp information.

16. A communications system comprising:

first and second communication devices according to claim 1, configured to communicate with each other via a transmission channel.

17. A consumer electronic device comprising:

a communication device according to claim 1.

18. The communication device of claim 1, wherein the wired transmission channel is a first transmission path over a multi-path wired transmission medium from at least one port of a first transmitter to the at least one receiver port, and the at least one interference channel includes a second transmission path over the multi-path wired transmission medium from at least one port of a second transmitter, different from the first transmitter, to the at least one receiver port.

19. A method of operating a communications system, comprising:

establishing at least a first point-to-point communication link between a first communication device and a second communication device via a wired multi-path transmission medium and a second point-to-point communication link between the first communication device or a third communication device and a fourth communication device via the wired multi-path transmission medium;

transmitting transmit signals from the first communication device or the first and the third communication devices; and decoding receive signals received at the second and fourth communication devices using a multi-link decoder algorithm or multi-link decoder matrix derived from channel state information describing transmission and interference channels of the wired multi-path transmission medium.

20. The method of claim 19, further comprising:

assigning to each communication link a number of spatial modes on the basis of bit rate requirements and channel performance in each communication link; wherein the transmit signals are transmitted from the first and third communication devices in accordance with the number of spatial modes respectively; and the multi-link decoder algorithm or multi-link decoder matrix are derived from the channel state information describing the transmission and interference channels and the number of spatial modes assigned to the respective communication link.

* * * * *